April 14, 1953
R. A. HARVEY
BATTERY CHARGING SYSTEM CONTROLLED BY
TIME AND VOLTAGE RESPONSIVE DEVICES
Filed Feb. 19, 1952
2,635,221
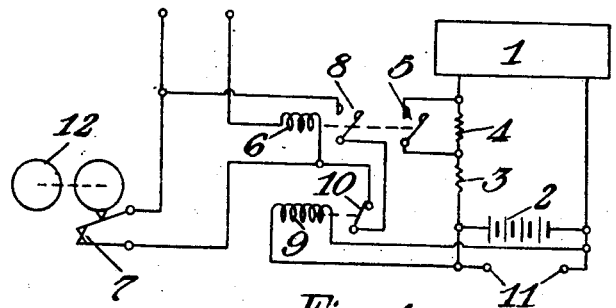
*Fig.1.*
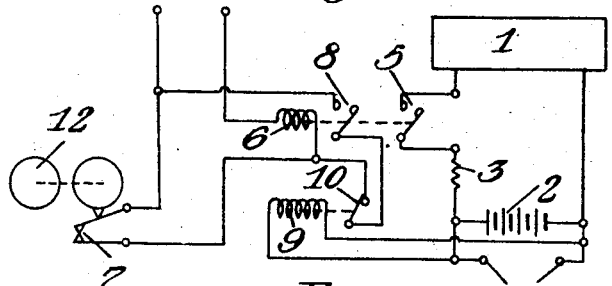
*Fig.1a.*
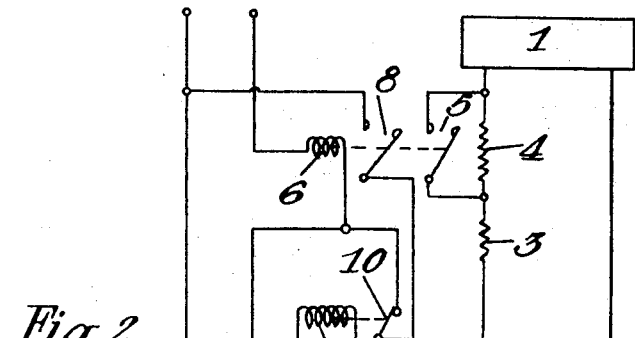
*Fig.2.*
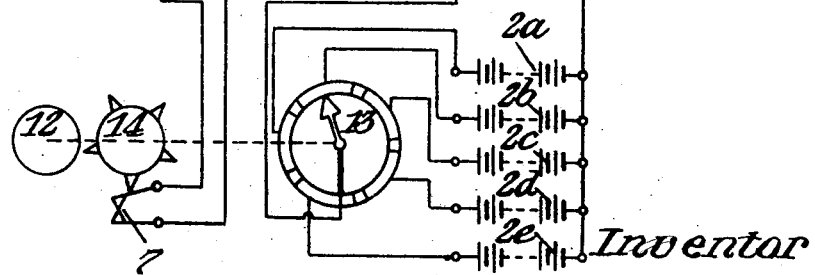
Inventor
R. A. Harvey
By Harvest Downing Diebold
Attys.

UNITED STATES PATENT OFFICE 2,635,221

BATTERY CHARGING SYSTEM CONTROLLED BY TIME AND VOLTAGE RESPONSIVE DEVICES

Robert Antony Harvey, Clifton Junction, near Manchester, England, assignor to The Chloride Electrical Storage Company Limited, Clifton Junction, near Manchester, England, a British company Application February 19, 1952, Serial No. 272,316
In Great Britain March 5, 1951

3 Claims. (Cl. 320—19)

This invention relates to a system for charging a secondary battery or batteries, and has for its object to provide an arrangement by which a battery or batteries floating between a D. C. supply source and a load can be kept correctly charged and not overcharged or overdischarged, and by which pasted plate batteries can be kept adequately charged while not in use without being subjected to continuous trickle charging which has a bad effect on pasted plate cells, and in which very short, frequent charging cycles, involving considerable wear and tear on relay contacts, are avoided.

According to the invention, a time switch is provided to give impulses at suitable intervals to energise a relay to initiate a full rate charging period, and a voltage relay is arranged to de-energised such relay when the battery reaches a substantially charged state, the relay having a holding circuit to keep it energised after the time switch has given an impulse and until the voltage relay responds, and being arranged to be re-energised only when a further impulse is received from the time switch.

The invention further comprises an arrangement for charging a number of batteries in turn, having a distributor driven in conjunction with the time switch for connecting the batteries to the charging current supply in succession, one at a time, the time switch being arranged to give an impulse after each battery has connected up.

Referring to the accompanying explanatory drawing:

Figure 1 is a circuit diagram of a convenient arrangement according to the invention.

Figure 1a shows another form of this arrangement.

Figure 2 shows a modified arrangement.

The arrangement shown in Figure 1, comprises a current source 1 connected to a battery 2 through a high rate resistance 3 and a low rate resistance 4 in series, so that normally the battery receives a low charging current. Across the low rate resistance 4 is connected a normally open contact 5 of a relay 6 which is energised by a time switch 7, driven by a timing mechanism 12, at suitable intervals such as one hour, in order to close the contact 5 and short-circuit the resistance 4 so that charging proceeds at a higher rate. The time switch 7 remains closed only for a brief period, but the relay 6 has a holding contact 8 to enable high rate charging to continue after the time switch has opened. A voltage relay 9, connected across the battery 2 and arranged to respond when the desired voltage is reached, has a contact 10 in series with the holding contact 8 so that when it responds the relay 6 is de-energised and the low rate resistance 4 is put in series again. At the same time the holding contact 8 opens, and the relay 6 cannot then be energised again by the voltage relay contact 10 closing when the battery voltage falls, but remains de-energised until the time switch 7 closes again. The load is connected to the terminals 11.

If continuous low rate charging is not desired, the arrangement shown in Figure 1a is used. This is similar to what is shown in Figure 1, except that the low rate resistance 4 is omitted and then the circuit is broken and charging ceases when the relay contact 5 is open.

The arrangement is applicable to the charging of the number of batteries in turn as shown in Figure 2. The clockwork mechanism 12 which actuates the time switch 7 also operates a distributor 13 to connect the charging source to the batteries 2a, 2b, 2c, 2d and 2e in turn, and the rotor 14 actuating the time switch 7 has a corresponding number of cams so that it gives an impulse to energise the relay 6 after each battery has been connected up. The arrangement operates in the same way as that shown in Figure 1. This arrangement is suitable for providing intermittent charging for conditioning charged pasted plate batteries while they are not in use.

The new system provides for automatic control of floating battery circuits without requiring special compensated rectifiers, or additional rectifiers for quick charges, and without requiring a relay responsive to the minimum battery voltage. A charge is given only at predetermined intervals and therefore wear and tear of relay contacts is reduced. It also provides for conditioning of charged pasted plate batteries without continuous trickle charging which would lead to antimony poisoning.

What I claim is:

1. An arrangement for charging a secondary battery in which a time switch is provided to give impulses at suitable intervals to energise a relay to initiate a full rate charging period, and a voltage relay is arranged to de-energise such relay when the battery reaches a substantially charged state, the relay having a holding circuit to keep it energised after the time switch has given an impulse and until the voltage relay responds, and being arranged to be re-energized only when a further impulse is received from the time switch.

2. An arrangement as claimed in claim 1, for charging a number of batteries in turn, having a distributor driven in conjunction with the time switch for connecting the batteries to the charging current supply in succession, one at a time, the time switch being arranged to give an impulse after each battery has been connected up.

3. An arrangement as claimed in claim 1, in which the charging current source is connected to the battery through a high rate resistance and a low rate resistance in series, and the relay which is energised by the time switch when energised short-circuits the low rate resistance to initiate a full rate charging period.

ROBERT ANTONY HARVEY.

References Cited in the file of this patent

UNITED STATES PATENTS

| Number | Name | Date |
|---|---|---|
| 422,438 | Pennock | Mar. 4, 1890 |
| 585,620 | Cox | June 29, 1897 |
| 1,433,078 | Hulss | Oct. 24, 1922 |
| 1,786,280 | Woodbridge | Dec. 23, 1930 |
| 2,166,788 | Amsden | July 18, 1939 |
| 2,197,423 | Agnew | Apr. 16, 1940 |
| 2,272,745 | Hinds et al. | Feb. 10, 1942 |
| 2,354,877 | Peters | Aug. 1, 1944 |
| 2,456,978 | Medlar | Dec. 21, 1948 |